United States Patent
Audoire et al.

[11] Patent Number: 5,553,761
[45] Date of Patent: Sep. 10, 1996

[54] LUGGAGE RACK FOR MOTOR VEHICLE

[75] Inventors: Philippe Audoire, Trappes Cedex; Michel Memeteau, Bressuire Cedex, both of France

[73] Assignees: Matra Automobile, Paris, France; Farnier Penin, Bressuire Cedex, France

[21] Appl. No.: 618,724

[22] Filed: Mar. 20, 1996

Related U.S. Application Data

[63] Continuation of Ser. No. 277,282, Jul. 21, 1994, abandoned.

[30] Foreign Application Priority Data

Jul. 22, 1993 [FR] France ..................... 93 09047

[51] Int. Cl.⁶ ..................................... B60R 9/00
[52] U.S. Cl. ............................ 224/321; 224/326
[58] Field of Search ...................... 224/321, 325, 224/326, 309

[56] References Cited

U.S. PATENT DOCUMENTS

| | | | |
|---|---|---|---|
| 3,545,660 | 12/1970 | Stephen | 224/321 |
| 4,448,337 | 5/1984 | Cronce | 224/321 |
| 4,972,983 | 11/1990 | Bott | 224/326 |
| 4,988,026 | 1/1991 | Rasor et al. | 224/321 |
| 5,069,377 | 12/1991 | Baughman | 224/326 |

FOREIGN PATENT DOCUMENTS

| | | | |
|---|---|---|---|
| 4035729 | 11/1990 | Germany. | |
| 2218062 | 11/1989 | United Kingdom. | |
| 94010007 | 5/1994 | WIPO | 224/321 |

*Primary Examiner*—Linda J. Sholl
*Attorney, Agent, or Firm*—Larson and Taylor

[57] ABSTRACT

The luggage rack, which can be used on the roof of a motor vehicle, comprises two rails fixed flat to the roof and at least two crossmembers, the ends of which can slide on the rails and be locked thereto. The two crossmembers include faces opposite each other which can be applied directly against one another so as to constitute a wing.

10 Claims, 6 Drawing Sheets

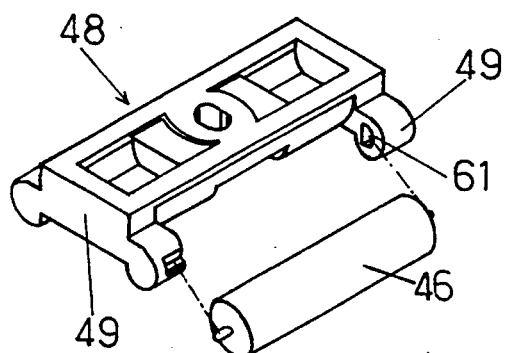
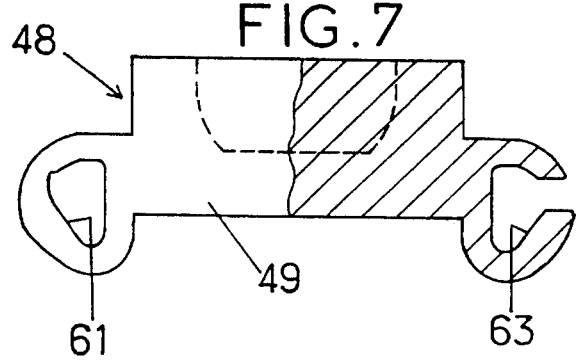
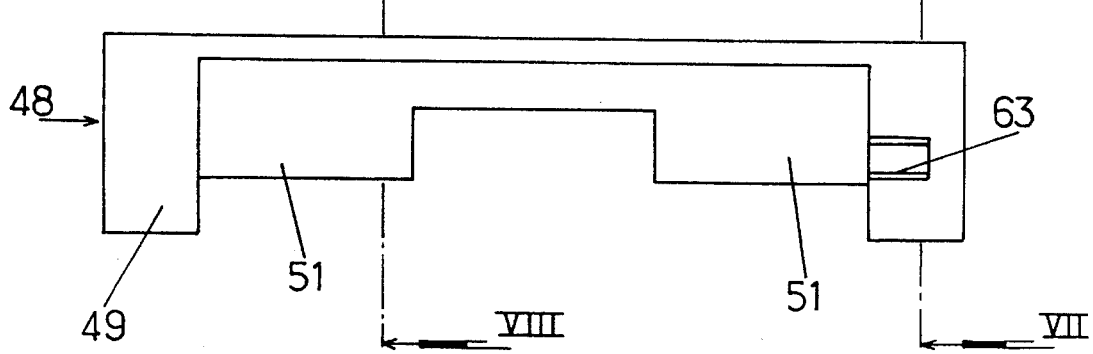
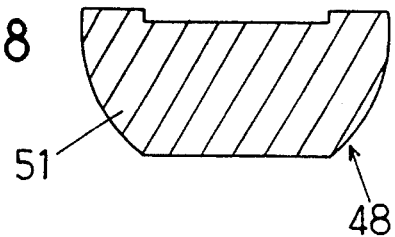
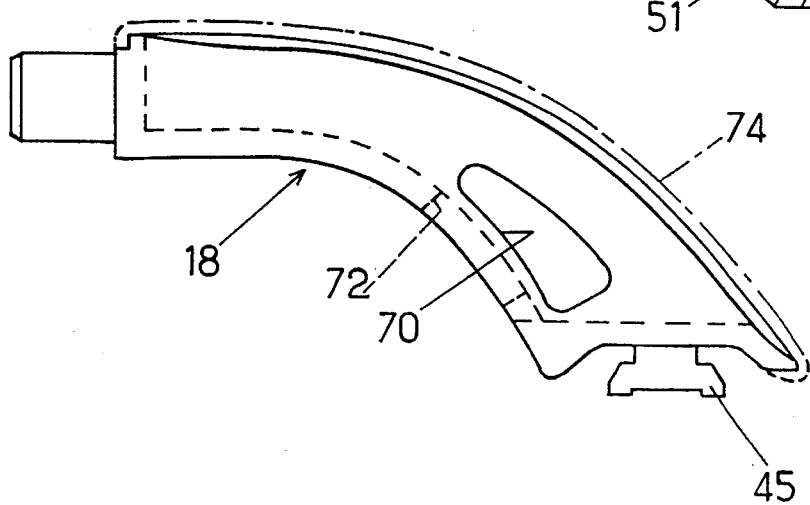

LUGGAGE RACK FOR MOTOR VEHICLE

This application is a continuation of application Ser. No. 08/277,282 filed Jul. 21, 1994, now abandoned.

BACKGROUND OF THE INVENTION

The present invention relates to luggage racks for the motor vehicle, comprising two rails intended to be fixed flat to the bodywork of a vehicle and at least one (and in general at least two) crossmembers, the ends of which are designed so that they can slide on the rails and so as to be locked thereto.

Luggage racks of the above type, which have the benefit of projecting very little when the crossmembers are removed, are described in various documents, such as (GB-A-2 218 062).

SUMMARY OF THE INVENTION

The present invention aims especially to provide a luggage rack of which the locking mechanism both ensures effective jamming and allows easy sliding of the crossmember along the rails, requiring only simple actions for jamming and for freeing.

To this end, a luggage rack comprises two rails intended to be fixed flat on the bodywork of a vehicle, each rail including a longitudinal member which exhibits a groove opening upward by means of a slot and at least one crossmember which includes two end legs, designed so that they can slide on the rails, and each equipped with a mechanism for locking on to rails. The mechanism includes rollers trapped in a groove defined by flanks of the respective rail, these rollers being wedged against the flanks in a first position of the control member and released in a second position.

Other features of the invention, which can advantageously be used in conjunction with the preceding one, and some of which can be used independently, are defined by the subclaims. In particular, in order to take account of the fact that users of a vehicle equipped with a luggage rack usually leave the crossmembers in place even when they are not using them, a design of the crossmembers is proposed considerably reducing the drag of the vehicle and the risk of annoying whistling noises at high speed.

To this end, when the luggage rack includes two crossmembers (which is the most frequent case), these advantageously have faces opposite each other which can be applied directly against each other over almost all of their length, so that the crossmembers then constitute a single wing.

The features hereinabove as well as others will emerge better from reading the description which follows particular embodiments, given by way of non-limiting examples. The description is given to the drawings which accompany it.

BRIEF DESCRIPTION OF THE DRAWINGS

FIG. 5 is a perspective view of the cage and of one of the rollers of the mechanism of FIGS. 2 to 4;

FIG. 6 is an elevation of the cage of FIG. 5;

FIG. 7 shows the cage, half as a view from the left of FIG. 6, and half as a section on the line VII—VII of FIG. 6;

FIG. 8 is a section on the line VIII—VIII of FIG. 6;

FIG. 10 shows a possible design of the leg, allowing passage for a strap for holding down luggage;

DESCRIPTION OF EMBODIMENTS

Figure 1:
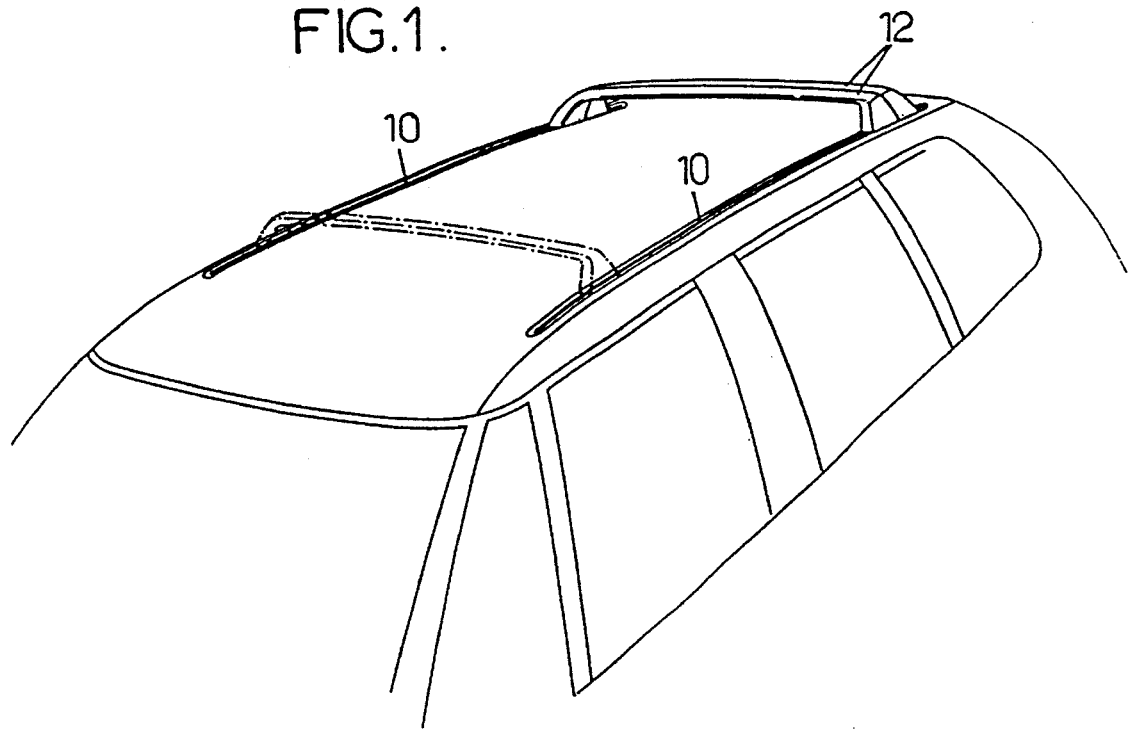
FIG. 1 is a view in perspective showing a general design of a roof-mounted luggage rack to which the invention may be applied, the crossmembers being represented in solid line in a position which is optimal in periods when they are not being used, and in chain line in a position which is possible for the purpose of using them.

The luggage rack, the general design of which is shown in FIG. 1, includes two rails 10 fixed flat, for example by screws, to the roof of a motor vehicle and two crossmembers 12 intended to support loads. These crossmembers can be moved along the rails 10. They are represented in chain line in a position in which they are separated from one another and allow loads to be held down. They are represented in solid line in a position in which they will generally be placed when they are not being used, and are butted up against each other.

In order to avoid the presence of a gap which would detract from the aerodynamic qualities of such a wing, each crossmember has an asymmetric design. The face of each crossmember intended to be applied against the other crossmember is substantially planar and orthogonal to the rails. These two crossmembers generally have an identical structure. However, in order to further increase the aerodynamic quality of the wing, it is possible to equip their main span sections with different fairings. If the structural elements remain the same, this approach does not appreciably increase the tooling, manufacture and stock-holding costs.

Figure 2:
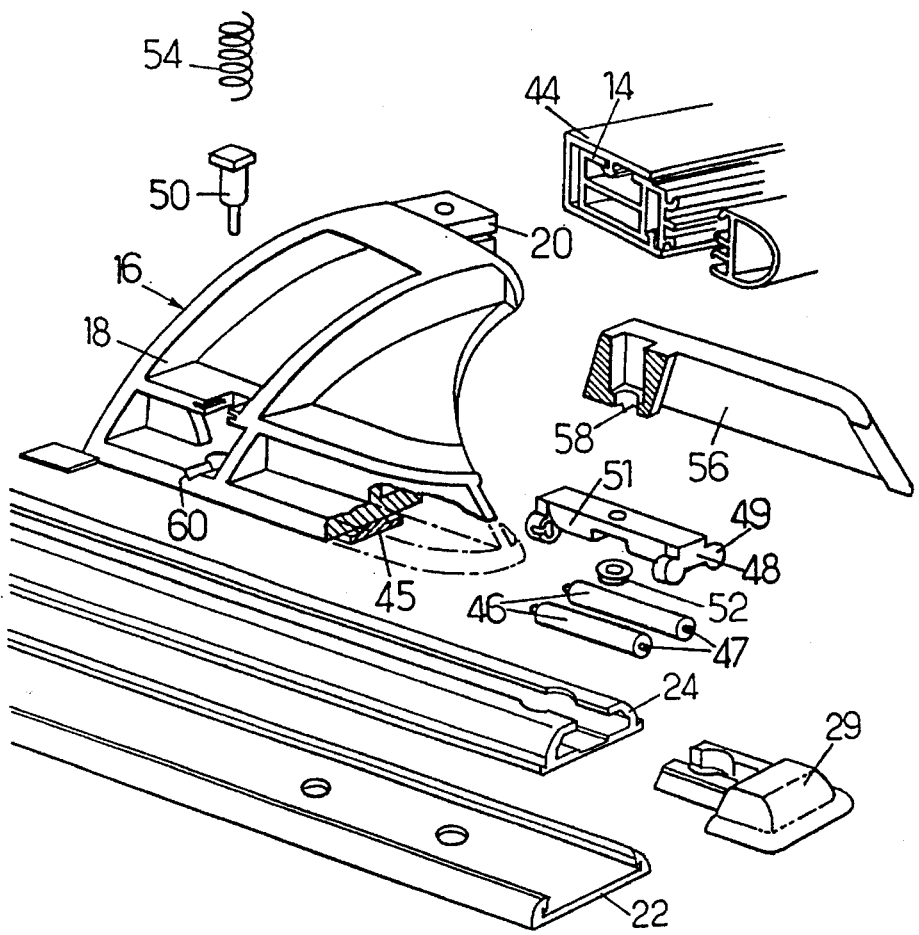
FIG. 2 is an exploded view in perspective of the components of a crossmember leg and of a rail to which the invention relates.

Each crossmember has an inverted U shape. As FIG. 2 shows, it may be considered as being made up of a horizontal or slightly curved hollow bar 14 formed of a metal section, for example made of lightweight alloy, and of two legs 16. Each leg includes a base 18, for example made of cast metal, exhibiting a stump 20 over which the bar is fitted. This base is intended to bear on one of the rails 10. The crossmember is supplemented by protective covers. One cover 42 covers over the base. Another cover 44 covers over and protects the bar. It may have a shape improving the aerodynamics of the crossmember. The covers may be held on by fitting and/or by demountable means, such as screws.

The rail 10 is composite in the embodiment represented. It is composed of an elongate sole 22 fixed rigidly and permanently to the roof of the vehicle, for example by evenly distributed screws and of a longitudinal member 24 held between folded-back flanks of the sole 22. The longitudinal member 24, which may also be made up of a section, defines a groove having downwardly divergent flanks and opening up toward the top in a longitudinal slot. The upper face of the longitudinal member constitutes a bearing face for the base 18 of the leg 16. The rail may be closed by end plugs 29. The base 18 includes two tenons 45, projecting downward, passing through the slot in the longitudinal member and having a T-shaped cross-section, the transverse bar of which T may be applied against the edges of the groove.

In order for the crossmember to be held positively on the rails, each leg base may exhibit one or more downwardly projecting pegs intended to engage in one of the housings of a rack fastened to the bottom. The spacing of the housings is thus designed so that the crossmembers can be locked in positions in which they are practically in contact with one another.

Figure 3:
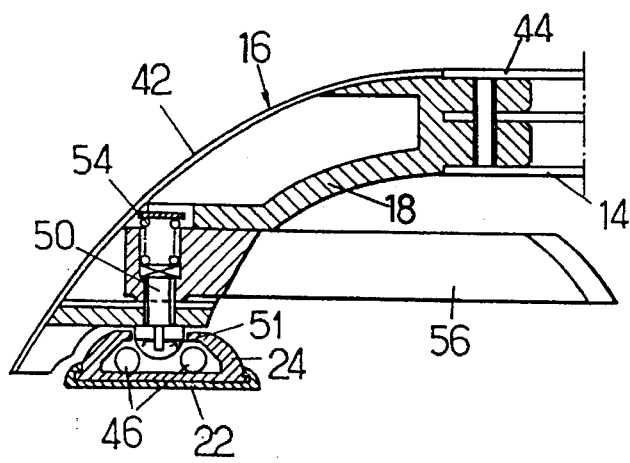
FIGS. 3 and 4 are sectional views showing respectively the unlocked state and the locked state of the mechanism shown in FIG. 2.
Figure 4:
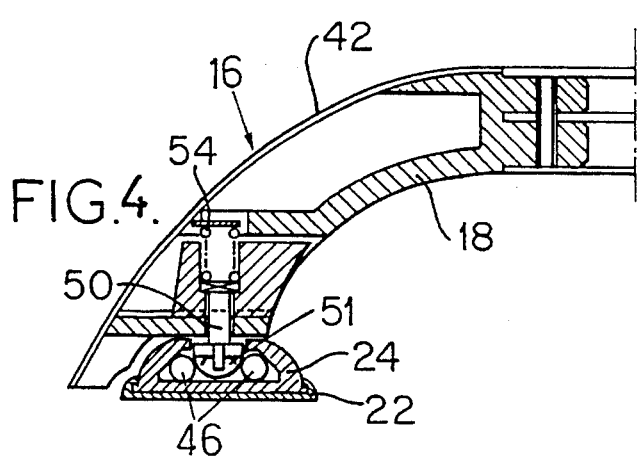

In the specific embodiment shown in FIGS. 2 to 4, the crossmember is immobilized by wedging of rollers 46 between the bottom and the flanks of the longitudinal member 24, which delimit a groove with a downwardly flared cross-section.

A manual mechanism for locking and unlocking includes two jamming rollers 46, having extensions 47, trapped in the groove of the longitudinal member 24 and placed between the tenons. The mechanism additionally includes means making it possible to move the rollers laterally outwardly to wedge them against the flank and the bottom of the longitudinal member. These means include a jamming runner 48 having two end cheeks 49 which longitudinally retain the rollers 46, locally having a body 51 with semi-cylindrical profile for acting on the rollers. The runner 48 is coupled, for example by means of a crinkle washer 52, to a pin 50 pushed back downward by a spring 54 which bears on a partition of the base.

The manual member for locking and unlocking is made up of a lever 56 which can rotate through 90° between a position in which it is retracted into the thickness of the base (FIG. 4) and a position in which it is parallel to the crossmember (FIG. 3). The lever 56 rotationally entrains the square head of the pin 50 which passes through it. Means are provided so that the lever 56 rises up, entraining the pin 50 when it passes from the position of FIG. 4 to the position of FIG. 3. In the case illustrated in FIGS. 2 to 4, these means include a rib 58 on the lever 56 which is housed in a groove of corresponding shape 60 in the base when the lever is in the locking position. Leaving the groove during rotation gives rise to the raising of the lever by a sufficient height to unwedge the rollers 46 and stop the tenons from bearing against the edges of the slot.

One possible design of runner 48 and of the rollers 46 is given in FIGS. 5 to 9. One of the end cheeks 49 includes two openings 61 for receiving end extensions 47 situated on one side of the rollers 46. The other cheek 49 includes blind scalloping 63 opening outward so as to allow the other extensions of the rollers to be engaged therein. As shown in FIGS. 9A and 9B, openings 61 and 63 permit limited motion of roller extensions 47 and a corresponding limited motion of rollers 46. This limited motion permits rollers 46 to be moved into a wedged position for locking a respective leg 16 to rail 10 and also permits the rollers to assume an unwedged position for permitting the respective leg to move relative to rail 10. The wedged and unwedged positions are described in more detail below in connection with FIGS. 3, 4, 9A and 9B. The body 51 is made up in two parts on either side of the mid plane.

The method for longitudinal adjustment and retention of the crossmembers becomes clear upon reading the foregoing description.

Figure 9A:
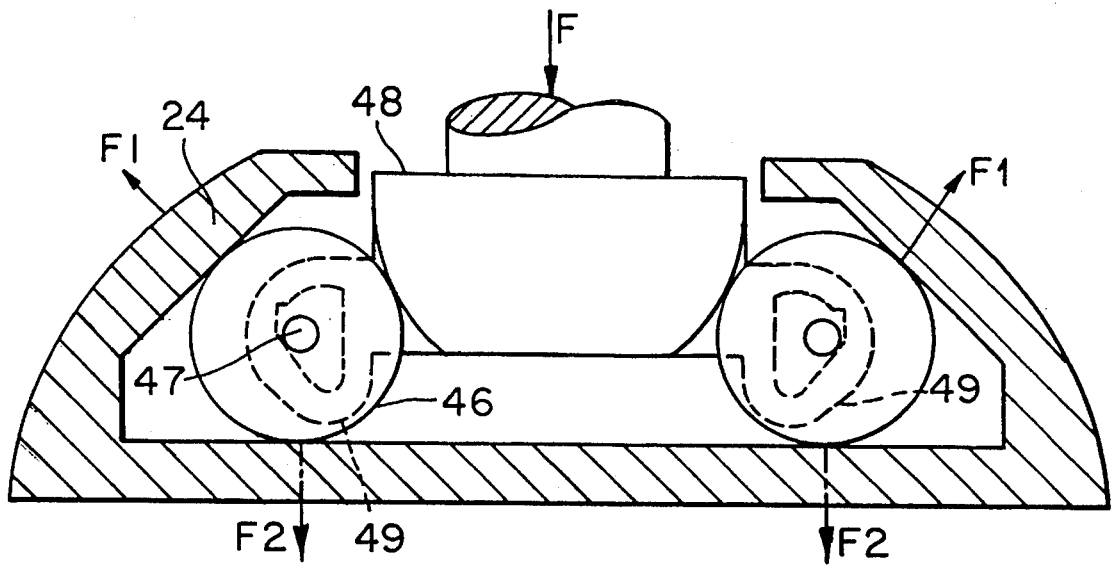
FIG. 9A is an enlarged view, partially in section, of a portion of FIG. 4.

In order to lock a bar (possibly when its pegs are facing housings in a rack), it is sufficient to place the lever 56 in the position in which it is represented in FIG. 4. The spring 54 then exerts a force F (FIG. 9A) on runner 51, which forces the rollers downwardly and outwardly against adjacent internal surfaces of longitudinal member 24. The rollers thus become wedged in the longitudinal member 24 as shown in FIGS. 4 and 9A. This results in symmetrical forces F1 and F2 (FIG. 9A), normal to the points of contact between rollers and the adjacent internal surfaces of the longitudinal member. Jamming is achieved by the friction of the rollers. This friction may be increased by using rollers with a striated or notched surface. The force may also be modified by a suitable choice of the angle between the bottom and the flanks of the longitudinal member 24. This angle generally will be approximately 45°.

Figure 9B:
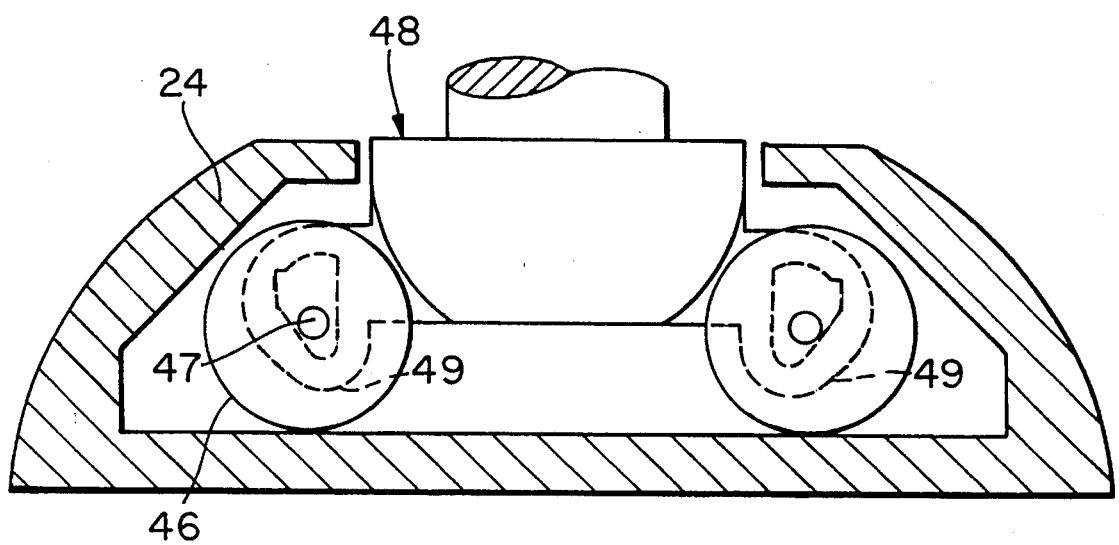
FIG. 9B is an enlarged view, partially in section, of a portion of FIG. 3.

Unlocking takes place by bringing the lever 56 into the position in which it is represented in FIG. 3 which removes force F (FIG. 9A). With force F removed, the rollers are no longer wedged against member 24 and are free to assume an unwedged position, as illustrated in FIGS. 3 and 9B. Thus, since the rollers are no longer wedged, bar 14 may then be moved longitudinally.

In general, the coefficient of friction of the rollers on the longitudinal member 24 is sufficiently low for it to be possible when the rollers are not wedged in member 24, to move a bar from just one side of the vehicle, which allows one individual to carry out positional adjustments on his own. The rollers are effectively generally made of plastic, although other materials can be used. However, it is possible, in order to reduce the friction further, to place on the runner a ball bearing of which the outer race can run on one or other edge of the slot of the longitudinal member.

Openings may be formed in the base 18 to give passage to straps for holding down luggage. FIG. 10 shows a possible arrangement of such scalloping 70 and 72. As the scalloping 72 is on the inner side, it is not covered over by any possible crossmember leg trim element 74.

In the embodiment shown in FIGS. 2 to 9, the lever 56, once brought into the unlocking position, remains there for as long as it has not been returned to the locking position. Consequently there is a risk of forgetting to lock one of the two crossmember legs. This risk is obviated in the embodiment shown in FIGS. 11 to 13, in which the members corresponding to those already described are denoted by the same reference numeral.

Figure 11:
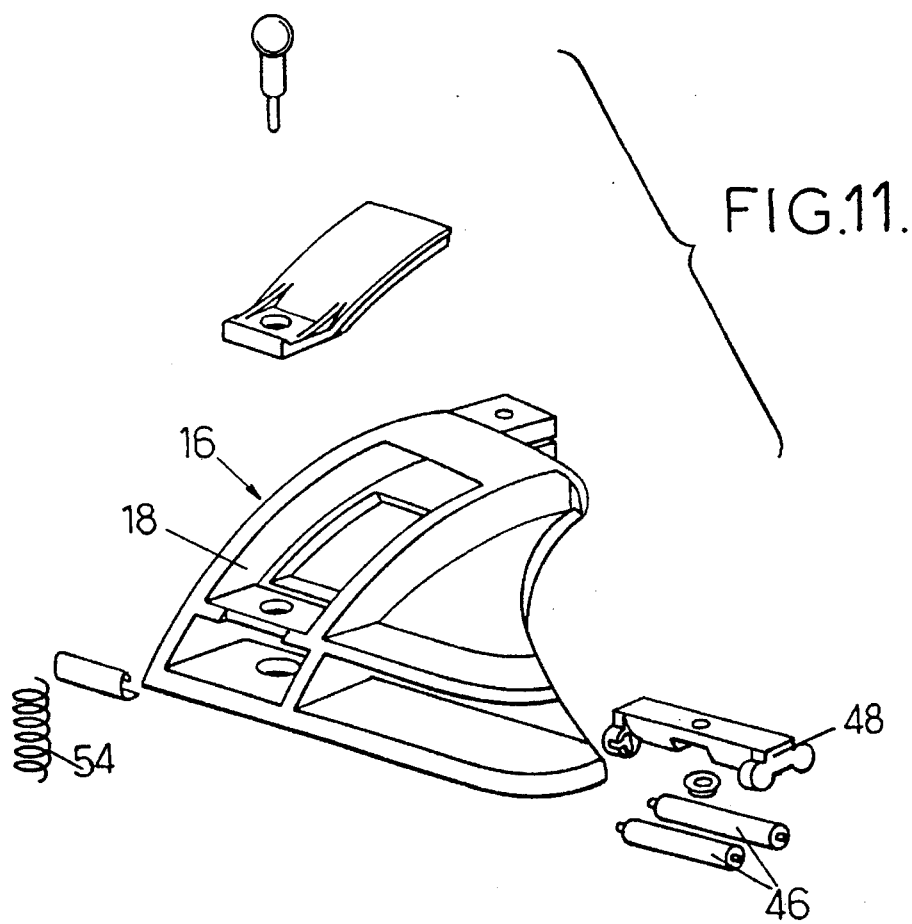
FIGS. 11, 12 and 13, which are similar to FIGS. 2 to 4, show a variant embodiment.
Figure 12:
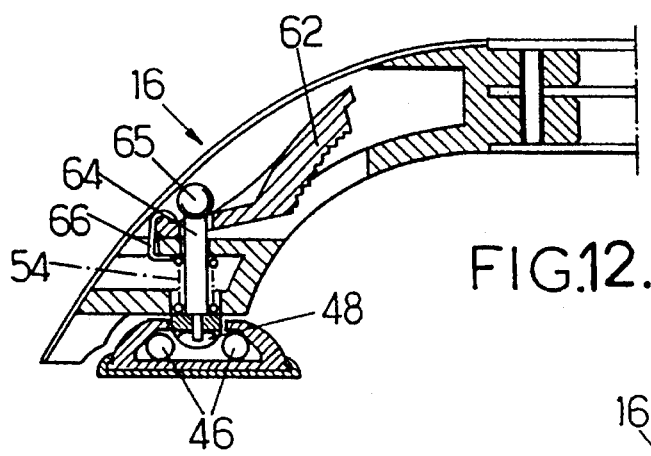
Figure 13:
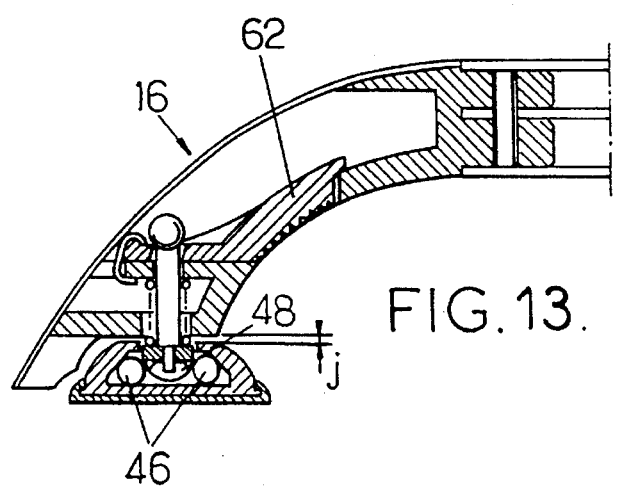

The locking mechanism shown in FIGS. 11 to 13 still comprises tenons secured to the base 18 of the leg (it being possible, for example, for these to be comolded on the main part of the base), jamming rollers 46, and a jamming runner 48. This runner is subjected to the pressure of a spring 54 which tends to press it on to the rollers and to wedge the rollers, and also to raise the tenons trapped in the groove. The manual member for unlocking this time consists of a lever 62 which can rock on the base between a locking position, in which it is in abutment against an edge of the base (FIG. 13), and a pushed-down unlocking position (FIG. 12). The lever 62 is coupled to the runner by a rod 64 including an end ball 65 for bearing against the lever. When no manual action is exerted on the lever, the latter is in abutment. The action of the spring pushes in the jamming runner 48 and wedges the rollers 46. In contrast, when the user pushes in the knob and brings it into the position shown in FIG. 12, causing it to rock about an articulation embodied by a clip 66, the rod 64 raises the runner which releases the rollers.

In this embodiment, the movement of the bar requires two operators, each of whom frees one of the legs and moves it. Owing to the fact that the leg relocks itself as soon as the knob is released and returns to the position shown in FIG. 13, the risk of a runner remaining unlocked is obviated.

Figure 14:
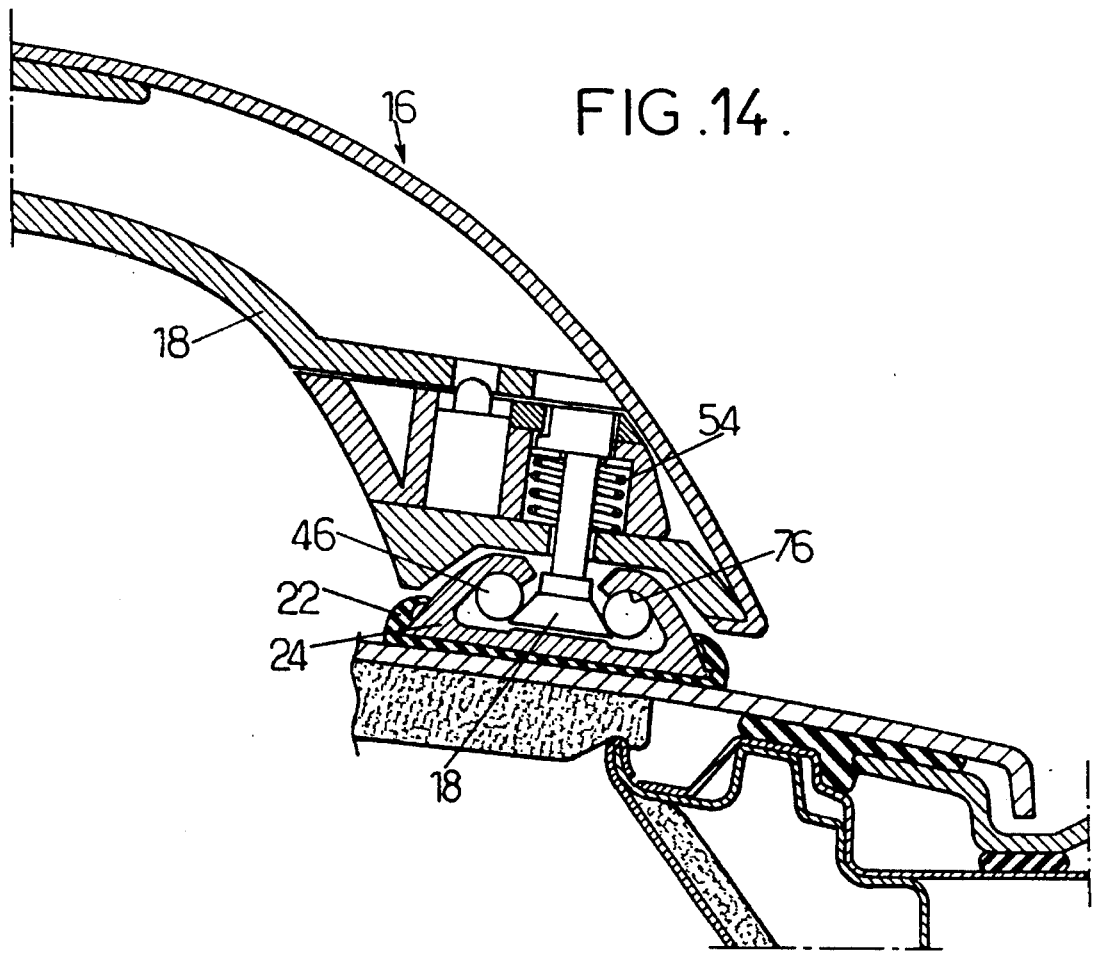
FIG. 14, similar to FIG. 3, shows yet another variant.
Figure 15:
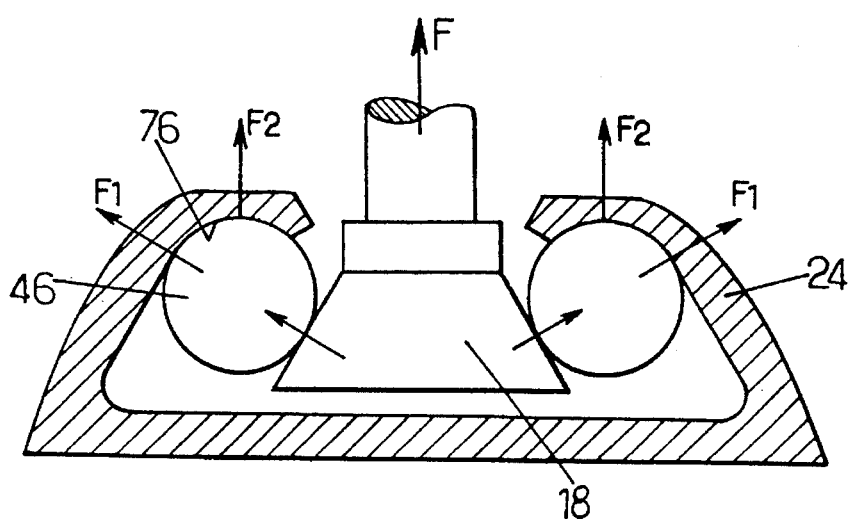
FIG. 15 is a diagram intended to demonstrate the method of operation of the variant of FIG. 14.

Whilst the embodiments of the locking mechanism described hitherto wedge the rollers by action of a downwardly pointing force, the embodiment represented diagrammatically in FIGS. 14 and 15 acts in the opposite direction. In FIG. 14, where some elements are not represented and where those corresponding to the embodiments of FIGS. 2 to 10 are denoted by the same reference numeral, the spring 54 exerts an upwardly pointing force F which generates forces F1 and F2 pressing the rollers 46, into downwardly pointing channels 76. The runner 48 therefore has a shape which is the reverse of that used in the preceding embodiments.

We claim:

1. Luggage rack for a motor vehicle comprising:

a pair of rails constructed to be fixed flat and mutually parallel and spaced on a bodywork of a vehicle, each rail including a longitudinal member formed with a groove of predetermined cross-section having an opening via a longitudinal slot and mutually divergent flanks; and at least one crossmember, said crossmember having:

a bar, two end legs each secured to a respective end of said bar and each slidably engageable with a respective one of said rails, and two locking mechanisms, each for locking one of said legs on the respective one of said rails and each including rollers trapped in said groove of the respective one of said rails, and a manual control member manually movable between a first position where it causes wedging of the rollers against the flanks of the groove and a second position where it releases said rollers.

2. Luggage rack according to claim 1, wherein:

said mechanism further comprises a runner movable in a base of the respective leg orthogonally to said rails between a first position where it forces said rollers apart against the flanks and a bottom of the groove, and a second position where it clears said rollers from said flanks, and spring means biassing said runner toward said first position thereof, and said control member is rotatably connected to the base of the respective leg for rotation about an axis orthogonal to a common direction of the longitudinal members, between said first position of the control member, in which it allows the spring means to move the runner to the fist position thereof and said second position of the control member in which it brings said runner into said second position thereof against the action of said spring means.

3. Luggage rack according to claim 2, wherein said lever is located so as to be entirely within a virtual envelope of the leg, when in said first position thereof.

4. Luggage rack according to claim 1, wherein:

said mechanism further comprises:

a runner movable in a base of the respective leg orthogonally to said rails between an active position where it wedges said rollers apart against the flanks and a bottom of the groove, and a disabled position where it clears said rollers from said flanks, and spring means biassing said runner to said active position, and said control member consists of a lever mounted on a base of the respective leg for rocking movement about an axis parallel to a common direction of the longitudinal members, between said first position of the control member, in which it allows the spring means to move the runner into said active position and said second position thereof in which it forcibly moves the runner to the disabled position.

5. Luggage rack according to claim 1, wherein said two end legs of said crossmember engage into respective ones of the ends of the bar and said bar is encased by the cover.

6. Luggage rack according to claim 1, comprising two of said crossmembers, each of said crossmembers having a face shaped to be applicable directly against a mating face of the other crossmember at least over at least most of an extent of said crossmembers, whereby the crossmembers when against each other constitute a single wing.

7. Luggage rack for a motor vehicle comprising:

a pair of spaced flat mutually parallel mounted rails on the bodywork of a vehicle, each rail including a longitudinal member formed with a groove of predetermined cross-section opening upwardly and having a bottom and flanks diverging toward the bottom, and at least one crossmember having two end legs each having a base slidably supported by a respective one of said rails, and two locking mechanisms each for locking one of said legs on a respective one of said rails, wherein each of said locking mechanism has rollers trapped in said groove of the respective one of said rails, a runner vertically movable in said base between a lower position where it spreads said rollers apart and wedges said rollers between said flanks and bottom and an upper position where it releases said rollers, spring means in said base biasing said runner downwardly and a control level rockable on said base about an axis parallel to said rails drivably connected to said runner and manually movable from a position where it is moved by said spring means to an actuated position where it lifts said runner against a return action of said spring means.

8. Luggage rack according to claim 7, wherein each of said rollers has means for connection with the runner against relative movement in the direction of the rails.

9. Luggage rack according to claim 8, wherein said connection means include axial end extensions of the roller engaged into openings of respective parallel flanges of the runner.

10. Luggage rack according to claim 7, wherein each of said levers is located within a recess of a respective one of said end legs.

* * * * *